Jan. 29, 1957   F. R. EICHNER   2,779,864
LIGHT RAIL

Filed Oct. 13, 1953   2 Sheets-Sheet 1

INVENTOR
Ferdinand R. Eichner
BY
ATTORNEY

Jan. 29, 1957　　　F. R. EICHNER　　　2,779,864
LIGHT RAIL

Filed Oct. 13, 1953　　　2 Sheets-Sheet 2

INVENTOR
Ferdinand R. Eichner
BY
ATTORNEY

United States Patent Office 2,779,864
Patented Jan. 29, 1957

2,779,864
LIGHT RAIL

Ferdinand R. Eichner, Pontiac, Mich., assignor to General Motors Corporation, Detroit, Mich., a corporation of Delaware Application October 13, 1953, Serial No. 385,817

1 Claim. (Cl. 240—7.1)

This invention relates to illuminating means for use in passenger carrying vehicles such as intercity busses, railway coaches, airplanes and the like and more particularly to illuminating means adaptable for association with a luggage or package carrying rack employed in such vehicles.

In the illumination of luggage or package carrying racks such as are employed in passenger carrying vehicles, it is necessary to provide a durable, compact and unobstructive housing for the lighting means employed. Fixtures secured near the rear of such racks are obstructed by packages placed upon the racks. Those fixtures secured above the carrying tray reduce the available storage space and cause objectionable glare to passengers seated below. Fixtures mounted apart from the storage racks are ineffective in providing sufficient illumination while those secured upon the rack are subject to damage in the normal use of the carriage tray.

It is now proposed to provide a housing for lighting fixtures which may be associated with the leading edge of a package carrying rack to provide proper tray illumination. The housing or light rail is adapted to extend the full length of the tray and is sufficiently durable in construction to protect the fixtures secured therein against possible damage from placing packages upon the tray. Ready access to the lighting fixtures is provided by removable cover plates secured to the upwardly opening housing to enable replacement and repair of damaged or burned out elements. The housing is also provided with bumper guards to further protect the lighting fixtures and to guard luggage and parcels against accidental damage upon engagement with the housing. In the use of the proposed lighting fixture housing direct illumination is provided for the carriage rack and indirect lighting for the passenger compartment.

It is further proposed to provide a lighting fixture housing which is adaptable for use in a number of different types of conveyances and in varied models of each vehicle without extensive alteration. It is proposed to provide as a standard accessory an elongated housing which may be cut to any desired length. The housing is adapted to receive any number of lighting fixtures and to enable ready relocation of such fixtures to any selected position within the housing. Cover plates and spacer plates are provided to close the housing and are interchangeable with other plates of different lengths to accommodate any relocation of the light sources within the housing.

It is a still further object of this invention to provide a housing for lighting fixtures which may be used to display advertisements posted along a walled surface. The housing may be easily secured to such surface below the advertisements and enables ready relocation of the lighting sources secured therein to provide for a more adequate display than previously possible. As many or as few lighting fixtures as may be required may be employed within the housing to achieve the most effective and pleasing display.

Figure 2 is a cross-sectional side elevational view of a part of the luggage rack having the light rail secured thereto and shown in more detail.

Figure 1:
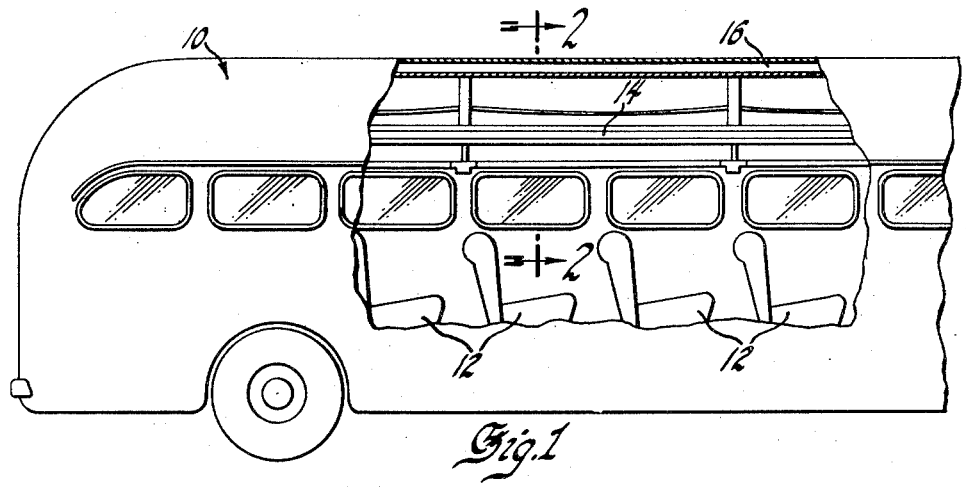
Figure 1 shows a part of a bus having one side partially broken away to more clearly show the passenger compartment with a luggage rack and light rail mounted therein.
Figure 2:
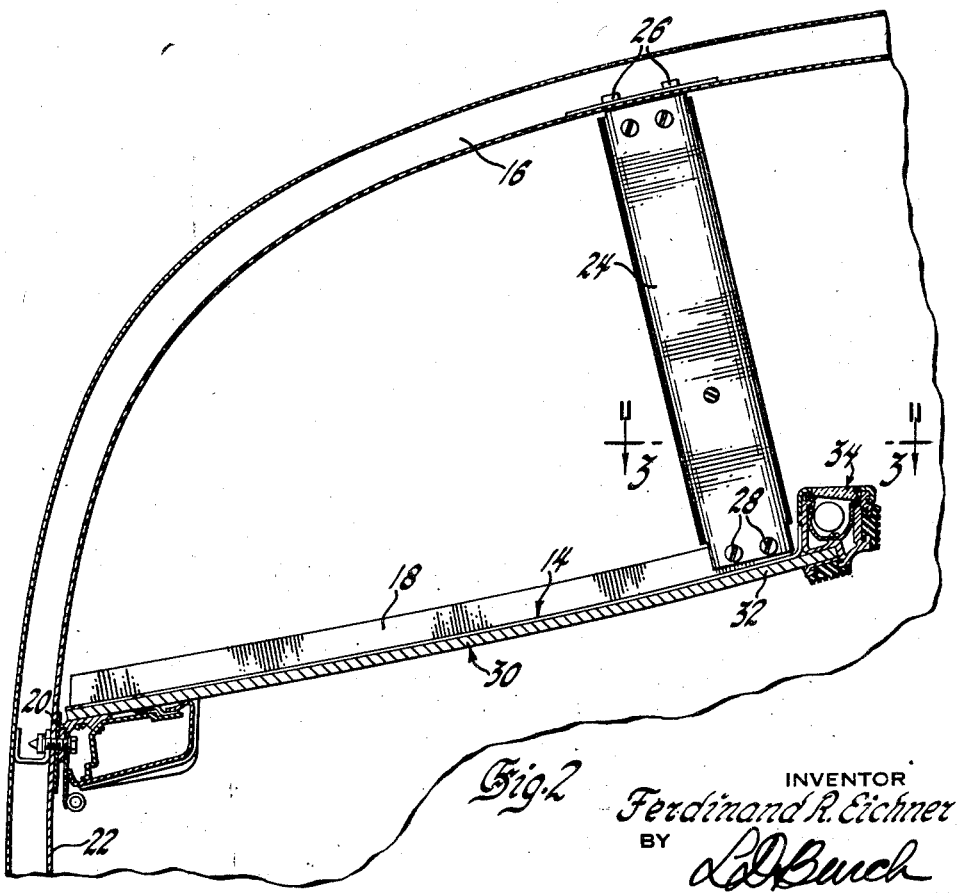
Figure 2 is a cross-sectional side view of the luggage rack and light rail as seen in the plane of line 2—2 of Figure 1 looking in the direction of the arrows thereon.
Figure 3:
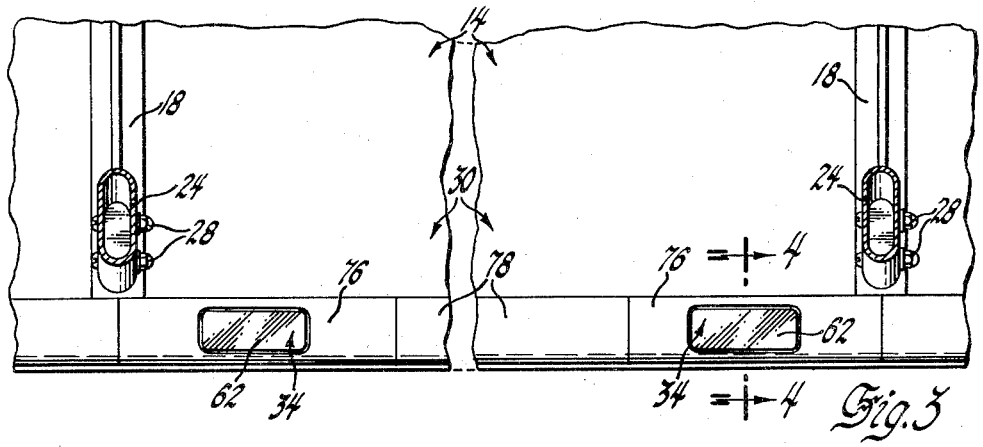
Figure 3 is a top view of the luggage rack and light rail taken in the plane of line 3—3 of Figure 2 and looking in the direction of the arrows thereon.
Figure 4:
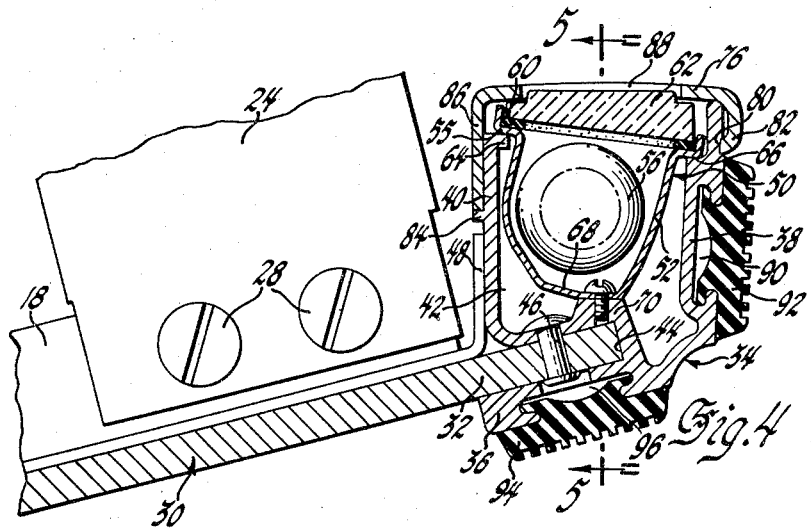
Figure 4 is taken in the plane of line 4—4 of Figure 3 looking in the direction of the arrows thereon.
Figure 5:
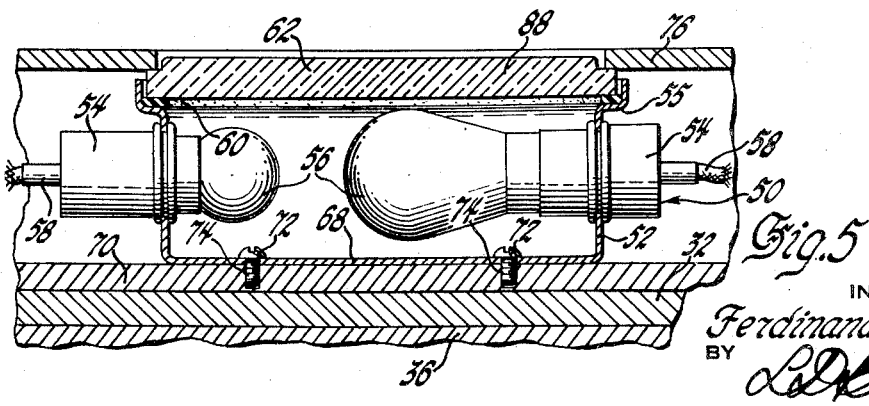
Figure 5 is a cross-sectional view of the light rail taken in the plane of line 5—5 of Figure 4 looking in the direction of the arrows thereon.

In a bus or other passenger carrying vehicle 10 having seats 12 disposed near the side walls of the vehicle a rack or tray 14 is mounted above the passenger seats and extended along the length of the vehicle near the roof 16 thereby providing a convenient yet removed place for the stowage of the passengers' luggage and other parcels. Although the package carrying rack 14 may be made in any convenient manner in the present instance several tray support members 18 are secured to brackets 20 mounted on the wall 22 of the vehicle and are suspended in spaced relation to the roof 16 by struts 24. The struts 24 are secured to the roof of the vehicle by screws or the like 26 and the supports 18 are fastened to the struts by bolts or other means 28. The support members 18 are spaced along the length of the vehicle 10 and have package carrying trays or plates 30 secured between adjacent support members to form the elongated package rack 14.

Secured to the outwardly protruding edge 32 of the package rack 14 and extending the full length of the vehicle 10 in association with the package rack is a housing member or light rail 34. The light rail 34 comprises a bottom 36 and parallel side walls 38 and 40 formed to provide an elongated channel 42 opening upwardly. The light rail housing 34 has a groove 44 formed in one side thereof and extending the entire length of the housing for receiving the outwardly extended edge 32 of the package rack 14. The light rail 34 is secured to the package rack by rivets or other means 46. Each tray support member 18 is turned upwardly at its outer end to form a shoulder 48 engaging and supporting the side wall 40 of the light rail housing.

Light fixtures 50 are adapted to be mounted within the housing 36 at any designated position along the length thereof. The fixtures 50 comprise casings 52 having light sockets 54 and bulbs 56 secured in opposite ends of the casing and necessary wiring 58 connected to the sockets. The casings 52 open upwardly and have an out-turned flange 55 formed around their upper edge to receive a gasket 60 and lens 62 thereon. The flange 55 is supported upon a lip 64 formed along the upper edge of the side wall 40 of the housing and upon a shoulder 66 formed along the inner surface and near the upper edge of the other housing wall 38. The bottom 68 of the casing 52 engages a ridge 70 formed in the bottom of the light rail 34 and extending the full length thereof. The light fixtures 50 are secured within the housing by screws 72 extending through the bottom of each of the casings 52 and engaging the ridge 70. Any number of light fixtures may be secured within the housing in this manner and may be readily relocated simply by providing other threaded recesses 74 at other positions along the ridge 70. The ridge may also be made with a plurality of such threaded recesses spaced along the ridge when the light rail is specifically intended for a use requiring frequent relocation of the lighting fixtures.

Cover plates 76 and spacer plates 78 are adapted to be removably secured over the open portion of the channeled housing 34 by engagement with the walls 38 and 40. A groove 80 is provided in the wall 38 to receive the curled edge 82 of the plates 76 and 78 and a shoulder 84 is formed on the wall 40 to support the other edge 86 of the plates. An opening 88 is provided within the cover plates 76 over the lighting fixtures 50 to enable the diffusion of light therethrough. The spacer plates 78 are adapted to be secured to the housing between the cover plates 76 to provide a flush and continuous covering for the light rail 34 throughout its entire length.

The side wall 38 of the light rail 34 has an undercut groove 90 formed therein and extending the length of the housing to receive a bumper member 92. Another bumper guard member 94 is similarly affixed to the bottom of the light rail within another undercut groove 96.

In a vehicle where it is desired to use the proposed light railing 34 a length adapted to extend along the package carrying rack 14 is pre-cut and secured upon the extended end 32 of the rack. The desired number of lighting fixtures 50 are secured within the light rail 34 in positions adapted to provide the best illumination for the purposes for which they are intended. In this regard, where the fixtures 50 are to be used only for illuminating the package rack 30 less fixtures would be required than where it is desired to provide indirect lighting for the entire passenger compartment. Having positioned the lighting fixtures 50 in the desired locations cover plates 76 are secured thereover. Spacer plates 78 are then secured to the light rail 34 between the cover plates 76 and are of a length adapted to form a contiguous covering throughout the rail in combination with the cover plates. The bumper guard members 92 and 94 are then secured to the outside of the light rail.

To revise the lighting arrangement all cover plates 76 and spacer plates 78 are removed to enable easy rearrangement of the fixtures 50. Where access is needed to only one of the fixtures 50, for replacing a burned-out bulb 56 for example, only the one cover plate disposed over such fixture need be removed. Where structural changes are necessary to a vehicle having the light rail mounted therein, the rail 34 may be cut or added to, as the case may be, so as to conform to any modification made to the package rack 14.

I claim:

In combination with a package carrying rack having an edge thereof extended outwardly, an elongated light rail adapted to be secured to said edge of said rack and including a channel member having a groove formed within and through one side of the base thereof for receiving said edge of said rack and supporting said channel member with the open side thereof disposed upwardly, a plurality of lighting fixtures received within said channel member, means securing said fixtures within said channel member in spaced relation to the side walls thereof, said fixtures having flanges formed from the upper edges thereof and received upon the side walls of said channel member, lens means received over said fixtures and within said flanges, and cover members engaging the side walls of said channel member and disposed to close the open side thereof and to engage said lens means upon said fixtures, those of said cover members adjacent said fixtures having openings therein to permit the light of said fixtures to shine therethrough.

References Cited in the file of this patent

UNITED STATES PATENTS

| | | |
|---|---|---|
| 784,344 | Pearson | Mar. 7, 1905 |
| 1,024,573 | Henderson | Apr. 30, 1912 |
| 1,359,510 | Kornicker | Nov. 23, 1920 |
| 1,695,283 | Hotchkin | Dec. 18, 1928 |
| 2,090,239 | Strang | Aug. 17, 1937 |
| 2,185,078 | Hagerty | Dec. 26, 1939 |
| 2,250,619 | Austin | July 29, 1941 |
| 2,263,063 | Allen | Nov. 18, 1941 |
| 2,310,593 | Orlicki | Feb. 9, 1943 |